United States Patent [19]
Jacoub et al.

[11] 4,225,780
[45] Sep. 30, 1980

[54] METHOD AND DEVICE FOR SUPERPOSING A MODIFIABLE MAGNETIC CODE ON A FIXED BAR CODE

[75] Inventors: Michel Jacoub, Paris; Gérard Nourigat, St. Remy les Chevreuse, both of France

[73] Assignee: Compagnie Generale d'Automatisme, Paris, France

[21] Appl. No.: 971,123

[22] Filed: Dec. 19, 1978

[30] Foreign Application Priority Data

Jan. 11, 1978 [FR] France .................................. 78 00638

[51] Int. Cl.³ ..................... G06K 7/08; G06K 19/06; G11B 5/02; G11B 5/09
[52] U.S. Cl. .................................. 235/449; 235/493; 360/18; 360/40
[58] Field of Search ....................... 235/449, 450, 493; 360/42, 43, 40, 18

[56] References Cited
U.S. PATENT DOCUMENTS 3,427,605  2/1969  Gabor ..................................... 360/43
3,483,539  12/1969  Poumakis .............................. 360/43
3,803,634  4/1974  Namikawa ........................... 235/493

*Primary Examiner*—Daryl W. Cook
*Attorney, Agent, or Firm*—Sughrue, Rothwell, Mion, Zinn and Macpeak

[57] ABSTRACT

The invention relates to magnetic recording. A method of superposing a modifiable magnetic code on a fixed bar code magnetizes the bars in two different directions by means of a write head. There is the provision for synchronising the application of write signals to the write head with the passage of the bars of the bar code and the system may include a bar code reading head which reads a code moved by a conveyor belt and which causes an image of the bar code to be stored in a shift register with each bar and each space of the bar code being represented by several successive 1's or 0's. The write head then includes a read winding which triggers (via) reading of the image, and the image is gated into a code generator that writes when an image bar is present thereby writing magnetically onto the real bars of the bar code.

7 Claims, 4 Drawing Figures

METHOD AND DEVICE FOR SUPERPOSING A MODIFIABLE MAGNETIC CODE ON A FIXED BAR CODE

FIELD OF THE INVENTION

The present invention relates to a method of superposing a modifiable binary code on a fixed code using bars disposed adjacent one another with spaces between them.

BACKGROUND OF THE INVENTION

Indeed, there is known a system of bar coding such as the one referred to as "CMC 7" which is used for coding data on bank cheques, such as, for example, their number.

The fixed bar code is read by magnetic detection of the bars (after prior magnetization) and for decoding, the spacing between the bars or the spacing between the upstream and downstream points of these bars is interpreted.

The invention provides for a magnetic binary code which can be modified at will (as in the case of ordinary magnetic tracks) for superposition on the well-known fixed code.

The invention provides a method of superposing a modifiable magnetic code on a fixed code constituted by a succession of magnetized bars separated from one another by spaces, wherein the bars are magnetized in two different directions by a write head for the modifiable magnetic code.

According to a first means of performing the method each bar of the succession of bars is magnetized in only one of said two directions, one of the two magnetization directions representing one of the two values of a binary variable and the other direction representing the other value of the variable.

According to a second means of performing the invention each bar of the succession of bars is devided into two zones, one of which is magnetized in one of said two directions and the other of which is magnetized in the other of said two directions, the order in which these two magnetization directions succede one another on a single bar determining the binary value of the bar the modifiable magnetic code.

According to a third means of performing the method, one of the two binary values of the modifiable magnetic code is represented by a bar magnetized in a single direction, while the other binary value is represented by a bar divided into two zones magnetized in opposite directions from each other.

The invention also provides apparatus for superposing a modifiable magnetic code on a fixed code according to the method, the apparatus including first and second magnetic heads and means for causing relative movement of the bar code supporting medium and the heads in such a manner that the bar code moves firstly past the first head and secondly past the second head, the first head including means responsive to the bar code to store an image thereof and the second head including firstly means responsive to the bar code to cause the stored image there of to be read in synchronism with the passage of the bar code past the second head and secondly means responsive to the synchronously read image to write a modifiable message on the bars of the bar code.

The invention also provides apparatus for superposing a modifiable magnetic code on a fixed bar code according to the third means of performing the method, the apparatus including a magnetic head which includes a read winding and a write winding and means for allowing writing only on the second half of any bar.

According to a preferred embodiment said means include a generator which emits a signal when a bar begins to pass under the air gap of the magnetic head which signal starts a timer unit whose output is connected to a write generator connected to the write winding.

Devices embodying the invention are described greater detail by way of example with reference to the accompanying drawings.

DESCRIPTION OF THE PREFERRED EMBODIMENTS

Figure 1:
FIG. 1 is a plan view which shows a known bar coding system.

FIG. 1 shows a set of seven bars which define six spaces; two wide ones and four narrow ones. The significance of the code results from the respective positions of the wide and narrow spaces. In the example given, the wide spaces are in the first and third positions and represent the digit 3, for example.

Usually, such a code is read magnetically and to do this, the bars, which are printed, are magnetized for reading.

In accordance with the invention, the bars are magnetized from the outset, to record a message which can be modified.

Figure 2:
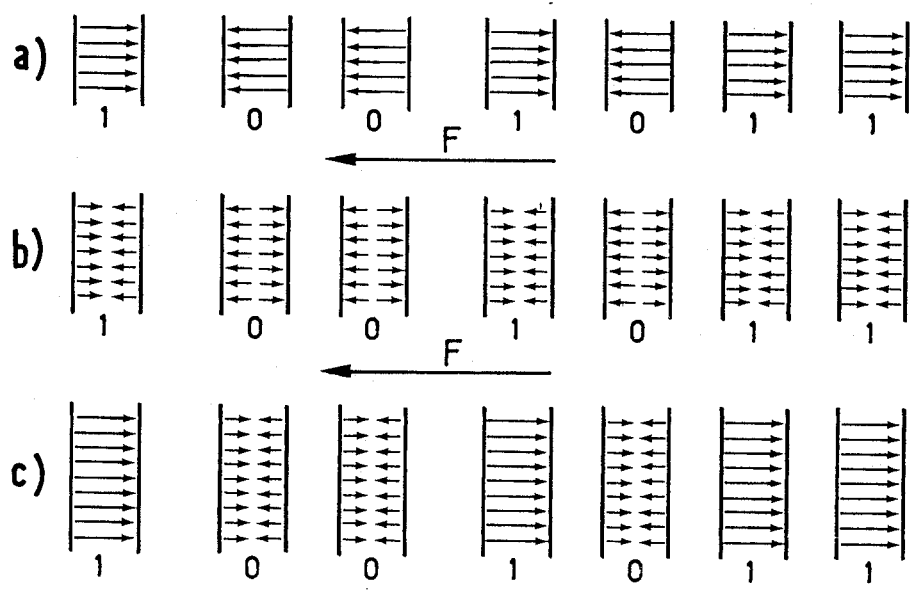
FIG. 2 is a schematic view showing three manners of producing a modifiable code superposed on the fixed bar code.

FIG. 2 shows three examples, on lines a, b and c, in which, in accordance with this invention, a modifiable code is superposed on a fixed code. The fixed code illustrated in the figure is the same as that illustrated in FIG. 1, which represents the digit 3.

In line a, each bar is magnetized uniformly in one direction or the other. According to its direction of magnetization, a bar represents either a "1" or a "0".

In line b, each bar is divided into two zones magnetized in opposite directions. According to the direction of magnetization of the two zones in a bar, the bar represents a "1" or a "0".

In line c, some bars are magnetized uniformly and they represent one of the binary values of the binary variable, e.g. a "1", and the other bars which represent "0"s are divided into two zones magnetized in opposite directions, the first zone being magnetized in the same direction as the bars which are uniformly magnetized to represent a "1". The first zone is the one which the write head (not shown) encounters first, if the code-bearing medium moves in the direction shown by the arrow F.

Figure 3:
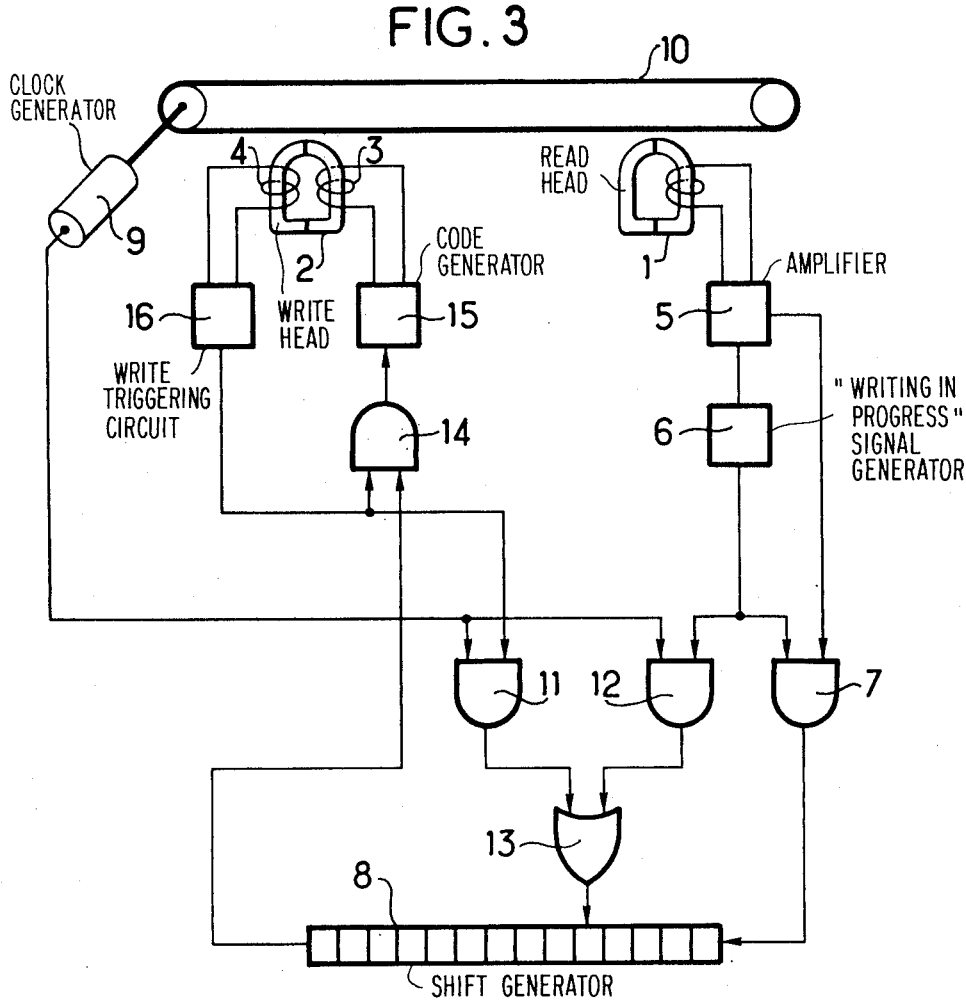
FIG. 3 is an electrical schematic circuit diagram which illustrates a device for superposing the modifiable code.
Figure 4:
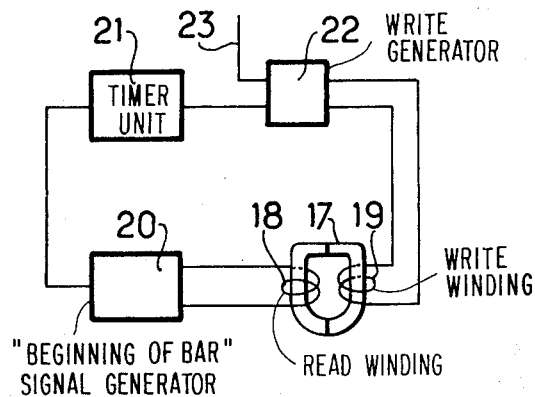
FIG. 4 is a schematic circuit diagram which illustrates another device for superposing the modifiable code.

One difficulty of this coding system resides in the synchronization which is necessary between the write head and the movement of the medium which bears the fixed bar-code. FIGS. 3 and 4 show two examples for applying the modifiable coding method in accordance with the invention.

The device of FIG. 3 which can be used for all three examples of coding illustrated in FIG. 2 includes a read head 1 and a write head 2 which has two windings: a first winding 3 which is a winding for writing the superposed code and a second winding 4 which is a read writing intended to trigger writing. An amplifier 5 amplifies the signals derived by the read head 1 and the output of the amplifier is sent firstly to a circuit 6 for generating a "reading in progress" signal and secondly towards the first input of a first AND gate 7 whose second input is connected to the output of the circuit 6. The output of the first AND gate 7 is connected to the input of a shift register 8. The device further includes a clock pulse generator 9 synchronized with the movement of a document which bears a bar-coded message. The document is fixed for example on a conveyor belt 10 driven by a mechanism which is not shown. The clock signals generated by the generator 9 are applied to the first inputs of second and third AND gates 11 and 12 whose respective outputs are applied to the two inputs of an OR gate 13 whose output controls the shifting of the register 8. The output of the register 8 is connected to the first input of a fourth AND circuit 14 whose output is connected to the input of a generator 15 which generates the code which is to be superposed on the bars. The output of the generator 15 is connected to the write winding 3. The second winding 4 feeds a write triggering circuit 16 whose output generates a signal which is applied to the second inputs of the second and third AND gates 11 and 12.

Operation is as follows:

It is assumed that a bar code is situated on the conveyor belt 10 or on a medium on the conveyor belt 10. When the first bar passes in front of the air-gap of the read head 1, the latter generates a signal which triggers the "writing in progress" signal generator circuit 6 which in turn generates at its own output a signal which lasts throughout the bar code read period of the read head 1 and allows the register 8 to shift when pulses arrive from the clock pulse generator 9. The circuit 6 can, for example, be constituted by a bistable which turns on at the first pulse and turns off at the seventh pulse in the case of a seven-bar code. With the circuit 6 triggered, the succession of bars read into the register shifts at each pulse given by the clock 9.

The separation between two clock pulses corresponds to a fixed length of the conveyor belt 10, for example of the order of a fraction of the thickness of a bar. Therefore, in the register, there is a succession of 1's and of 0's which corresponds to the presence of bars and to the spaces between the bars. The number of successive 1's and 0's depends on the width of the bars and on the width of the spaces which separate them. The fixed bar code is thus contained in the register in the form of an image.

The winding 4 detects the first bar as it arrives under the air-gap of the write head 2 and the write triggering circuit 16 delivers a register shift authorization signal via the second AND gate 11 and a write authorization signal via the fourth AND gate 14. Shifting again takes place at the rate of the clock 9, i.e. as a function of the running speed of the conveyor belt 10. The image code is shifted out of the register 8 and at each output of a "1" from the register, the modifiable code generator 15 is activated to magnetize the corresponding bar situated under the air gap. The generator 15 can apply any of the three coding methods described with reference to FIG. 2, the fourth AND gate 14 serving simply to indicate the instants at which magnetic material, capable of recording the modifiable code are actually available for coding. No code is superposed on the first bar, which thus serves only to give the shift register its start signal. Like the "reading in progress" signal generating circuit 6, the write triggering circuit 16 can, for example, be constituted by a bistable which turns on at the first bar and which turns off only when the seventh pulse is received.

FIG. 4 illustrates another embodiment suitable for the coding shown at line c in FIG. 2.

In this device, there is only one magnetic head which has a read winding 18 and a write winding 19. The read winding 18 is connected to a "beginning of bar" signal generator 20 whose output is connected to a timer unit 21, the timer period corresponding to the transit time of a half bar under the magnetic head 17. Lastly, the device includes a write generator 22 which is synchronized by the signal at the output of the timer unit 21 and controlled by an input 23 which receives the code to be superposed. In the device, only the second zone of the bar (see FIG. 2c) is optionally modified at each rewrite, while from the outset, all the bars are uniformly magnetized in the direction which corresponds to the permanent magnetization of the first zone.

In the device, the running speed of the medium on which the bars are written is assumed to be constant with a tolerance of a few percent and the timer unit 21 is designed for this speed taking into account the stickness of the bars.

Operation is as follows: When a bar passes under the magnetic head 17, the winding 18 energizes the signal generator 20 which triggers the timer unit 21; the write current is then applied, where appropriate, after the time interval given by the unit 21.

We claim:

1. A method of coding comprising the step of superposing a modifiable magnetic code on a fixed code consituted by a succession of magnetized bars separated from one another by spaces, wherein said step of superposing a modifiable magnetic code on a fixed code comprises the step of magnetizing the bars in two different directions by a write head.

2. A method according to claim 1, wherein each bar of the succession of bars is magnetized in only one of said two directions, one of the two magnetization directions representing one of the two values of a binary variable and the other direction representing the other value of the variable.

3. A method according to claim 1, wherein each bar of the succession of bars is divided into two zones, one of which is magnetized in one of said two directions and the other of which is magnetized in the other of said two directions, the order in which these two magnetization directions succeed one another on a single bar determining the binary value of the bar in the modifiable magnetic code.

4. A method acording to claim 1, wherein one of the two binary values of the modifiable magnetic code is represented by a bar magnetized in a single direction, while the other binary value is represented by a bar divided into two zones magnetized in opposite directions from each other.

5. Apparatus for superposing a modifiable magnetic code on a fixed bar code constituted by a succession of magnetized bars separated from one another by spaces, comprising the step of magnetizing the bars in two different directions by a write head, said apparatus comprising first and second magnetic heads, means for causing relative movement of the bar code supporting medium and the heads in such a manner that the bar code moves firstly past the first head and secondly past the second head, said first head including means responsive to the bar code to store an image thereof said second head including first means responsive to the bar code to cause the stored image thereof to be read in synchronism with the passage of the bar code past the second head and second means responsive to the synchronously read image to write a modifiable magnetic code message on the bars of the bar code.

6. Apparatus for superposing a modifiable magnetic code on a fixed bar code according to a method comprising the step of magnetizing the bars in two different directions and wherein one of two binary values of the modifiable magnetic code is represented by a bar magnetized in a single direction, while the other binary value is represented by a bar divided into two zones magnetized in opposite directions from each other, said apparatus comprising a magnetic head containing an electromagnet, said magnetic head being fitted with a read winding and a write winding, means for causing relative movement of the bar code supporting medium and said head in such a manner that the electromagnet passes relatively across said bars, and wherein said apparatus further comprises a timer unit and means connected to said read winding for sensing the appearance of the beginning of a bar in front of said electromagnet to release said timer unit to allow writing by said write winding only when the electromagnet passes in front of the second half of the bar.

7. Apparatus according to claim 6, wherein said means for allowing writing only when the electromagnet passes in front of the bar comprises a generator which emits a signal when said bar begins to pass under the magnetic head, and said timer unit operation is initiated by said signal and said generator output is connected to a write generator connected to said write winding of said magnetic head.

* * * * *